May 16, 1933.  E. E. LANDAHL  1,908,905
BACKSTOP FOR MACHINERY
Filed April 11, 1930   2 Sheets-Sheet 2

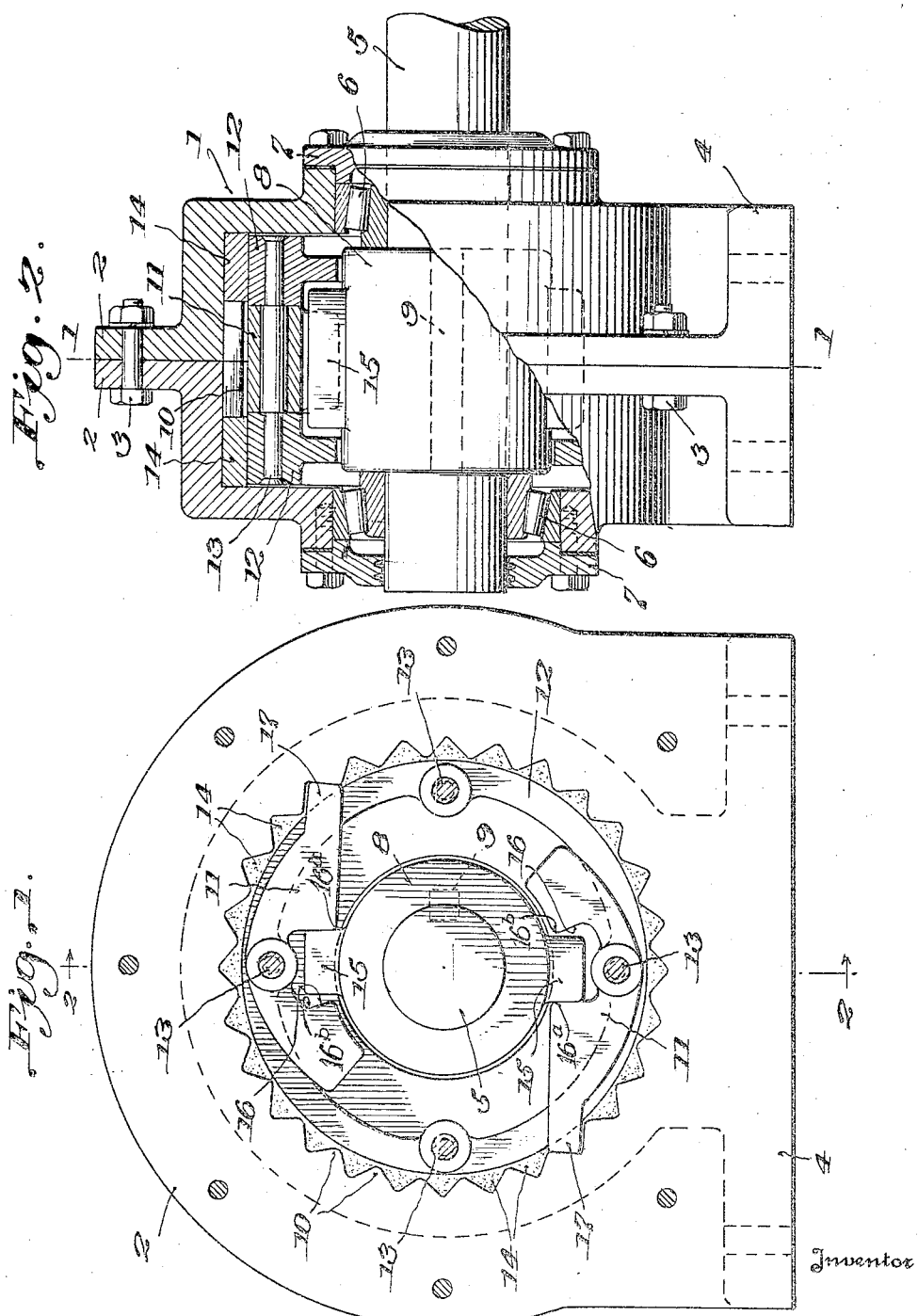

E. E. LANDAHL, Inventor

By Steward & McKay
Attorneys

Patented May 16, 1933

1,908,905

UNITED STATES PATENT OFFICE

EUGENE E. LANDAHL, OF FAIRMONT, WEST VIRGINIA

BACKSTOP FOR MACHINERY

Application filed April 11, 1930. Serial No. 443,517.

This invention relates to back stops for machinery of all kinds, adapted more particularly to prevent reverse rotation of driven parts when the power supply thereto is discontinued or becomes insufficient to produce forward rotation of such driven parts. Obviously the invention has an almost unlimited range of application, although especially suited for use in connection with elevators, mine hoists, conveyors and the like. The various forms of back-stops previously proposed have not proved satisfactory in practice. Rollers or balls operating in spaces having inclined walls so as to wedge in one direction and run free in the other direction, do not give satisfactory results on account of the fact that, owing to the continuous relative movement of the rollers or balls, the latter in time wear grooves in the housing and then fail to function. Spring actuated pawls are noisy and the constant movement of the pawl soon wears away either the end of the pawl or the ratchet teeth over which it runs or both.

The principal objects of the present invention are to provide a back-stop which may be made a part of one of the bearings and whose operating parts move with a minimum of wear and without noise.

The combination of a back-stop and a bearing is particularly advantageous in that it avoids the necessity of providing special supporting means for the back-stop, and the bearing portions form a desirable housing for the back-stop mechanism to exclude dust and dirt therefrom.

The back-stop itself is advantageously constructed so that in normal operation the parts all have purely rotative movement about the axis of the shaft whose reverse rotation is to be prevented. This allows wear to be reduced to a minimum, especially if the friction of relatively rotating parts is reduced by ball or roller bearings, antifriction metal or the like.

One desirable practical form of construction is shown, by way of example, in the accompanying drawings, wherein:—

Figure 1 is a transverse central section through the apparatus on the line 1—1 of Figure 2, with parts in elevation, showing the pawls in position to prevent reverse rotation of the shaft.

Figure 2 is in part a section on the line 2—2 of Figure 1 with parts in elevation and in part a side elevation.

Figure 3:
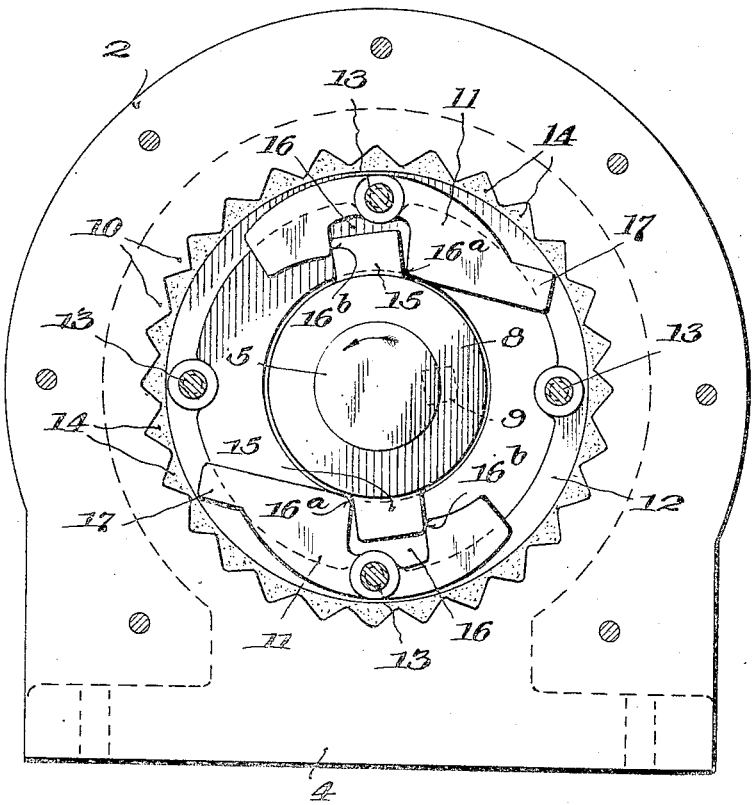
Fig. 3 is a view similar to Fig. 1, but with the pawls in position to permit forward rotation of the shaft.

The apparatus comprises a hollow bearing block or housing 1, which, for convenience in manufacture and assembly, may be made in two identical sections formed with laterally and outwardly extending flanges 2 by which the two sections may be clamped together by bolts 3. Each section is provided with a base 4 by which the bearing block may be secured to any suitable supporting means.

The shaft 5 is journaled in the bearing block in any convenient manner, such as by rollers 6 arranged between suitable bearing surfaces or runways. The outer roller runways are formed by steel rings 7a held in place by rings 7, bolted to the ends of the bearing block. The inner roller runways 8a abut against the ends of a steel collar 8, which is non-rotatably secured to the shaft 5 by a key 9. The rings 7 are to advantage formed with a radially inwardly extending grooved flange, in the grooves of which felt or other packing may be inserted to contact with the shaft 5 for the dual purpose of excluding dirt and retaining oil.

The peripheral interior surface of the bearing block is formed with a series of inwardly projecting teeth or serrations 10 to be engaged by pawls 11. The latter are mounted so that they are moved in and out of engagement with the serrations without the aid of springs or the like. Further, the pawls are so designed and mounted that when the shaft is turning in the direction of the arrow, shown in Fig. 1, the pawls are entirely out of contact with the serrations and there is no movement of any of the parts other than a smooth noiseless rotation of the moving parts about the axis of the shaft. Further, it is advantageous to use a plurality of pawls symmetrically disposed about the shaft to give balance to the apparatus. These advantageous results may be obtained in various ways, one convenient method involving mounting the pawls on a squirrel-cage formed of two rings 12 connected by four pins 13. Two of these pins form the pivots for the pawls 11. The outer edges or surfaces of the rings 12 contact with annular strips 14 of antifriction metal, such as babbitt, cast in engagement with the outer portions of the serrations 10. In this way the squirrel cage is supported by but free to rotate with respect to the bearing block.

The friction between the edge of the rings 12 and the antifriction metal strips 14 is greater than the friction between the pawls and the pins 13 on which they are mounted. Hence, by providing a loose connection between the shaft and the pawls, the turning of the shaft will first cause the pawls 11 to turn on their pins as far as possible and not until that has been accomplished will the squirrel cage be moved.

The pawls and shaft 5 may be loosely connected in various ways. One convenient method is by means of lugs 15 projecting outwardly from the collar 8 and extending into recesses 16 in the pawls. These recesses are wider than the projections to allow the desired relative movement between such projections and the adjacent pawls.

The pawls are so designed and mounted that movement of the shaft in one direction only (i. e. in the opposite direction to that indicated by the arrow in Fig. 3) causes the pawls to engage the serrations 10. This is conveniently accomplished by providing a projecting tip 17 on one arm of each pawl which engages the serrations 10 (see Fig. 1) when the shaft 5 attempts to rotate in the direction opposite to that indicated by the arrow in Fig. 3 to prevent such rotation, each pawl being so mounted that when shaft 5 rotates in the direction of the arrow in Fig. 3, shoulder $16^a$ of each pawl engages collar 8 to act as a stop to restrain outward movement of the other arm of the pawl at a point early enough to prevent the end of such other arm of the pawl coming into engagement with the serrations 10 (see Fig. 3).

A double-ended, centrally pivoted pawl, as shown, has the advantage that it enables the pawl to be balanced against centrifugal force, which would otherwise force the tip 17 outwardly against the serrations and thereby cause friction, wear and noise, when the shaft is turning in the direction of the arrow in Fig. 1.

Preferably the interior of the bearing is filled with oil to ensure thorough lubrication and reduce wear.

While the back stop may advantageously be combined with and made a part of one of the shaft bearings, such combination is not essential and the back stop may be arranged in a housing supported by the shaft, although provided with means for preventing rotation of the housing with the shaft.

In operation, if the shaft is turned in the direction of the arrow shown in Fig. 3, the projections 15 engage the shoulders $16^b$ of the recesses 16 of the pawls, and, since the friction of the pawls on their pivots 13 is less than the friction of the squirrel cage with respect to the babbitt strips 14, cause the pawls to turn about their pivotal axes so as to draw the projecting ends or tips 17 of the latter out of engagement with the teeth or serrations 14. This turning movement continues until the other shoulders $16^b$ of the recesses in the pawls contact with the collar 8. This occurs before the ends of the pawls opposite the tips 17 contact with the teeth 10. As soon as the pawls have completed this movement, further rotation of the shaft produces rotation of the squirrel cage.

When the shaft is turned in the opposite direction (see Fig. 1) the pawls are rotated about their pivotal axes in the opposite direction so as to bring the tips 17 in engagement with the teeth 10, thereby preventing any further rotation of the shaft in that direction.

What is claimed is:

1. A combined back-stop and bearing comprising a shaft, a hollow bearing therefor, having on its interior face internally directed projections and a pawl operatively connected to said shaft adapted by radial movement and independently of centrifugal force to engage said projections in only one direction of rotation of said shaft, said pawl being held out of engagement with said projections when the shaft rotates in the other direction.

2. A back-stop comprising a rotatable member, a stationary annular member surrounding the first member, inwardly extending projections on the second member, a ring rotatably mounted within the second member and in frictional engagement therewith, a pawl pivotally mounted on said ring, and a movable operative connection between the pawl and said rotatable member to allow the frictional drag of said ring to turn said pawl about its pivot, rotation of said rotatable member in one direction moving the pawl into engagement with one of said projections.

3. A back-stop as in claim 2 in which said operative connection comprises a recess in said pawl on the side opposite said rotatable member and a projection on said rotatable member entering and loosely engaging the walls of said recess.

4. A back-stop as in claim 2 in which a band of antifriction metal is mounted in engagement with said projections opposite to and in frictional engagement with the periphery of said ring.

5. A back-stop comprising a rotatable member, a stationary annular member surrounding the first member, inwardly extending projections on the second member, a ring rotatably mounted within the second member and in frictional engagement therewith, a pawl pivotally mounted intermediate its ends on said ring, a projection on the first member adapted to engage a recess in said pawl adjacent the pivot of the latter to turn the pawl in either direction according to the direction of rotation of the first member, movement of the pawl in one direction bringing one end of the pawl in locking engagement with one of said projections and means for limiting movement of the pawl in the opposite direction sufficiently to prevent the other end of the pawl engaging said projections.

6. A back-stop comprising a rotatable member, a stationary annular member surrounding the first member, inwardly extending projections on the second member, a ring rotatably mounted within the second member and in frictional engagement therewith, and a pawl pivotally mounted on said ring, the pivot point of said pawl being so located that the centrifugal force produced by the rotation of said ring has substantially no turning effect on the pawl, movement of the first member in one direction moving the pawl into engagement with one of said projections.

7. A back-stop as in claim 2 in which the pivot point of said pawl is so located that the centrifugal force produced by the rotation of said ring has substantially no turning effect on the pawl.

8. In a device of the character described, a rotatable member, an annular member surrounding the rotatable member and provided with a plurality of inwardly extending projections, a third member rotatably mounted within the second member and in frictional engagement therewith, a pawl pivotally mounted on said third member, and a movable operative connection between the pawl and said rotatable member to allow the frictional drag of said third member to turn said pawl about its pivot, rotation of said rotatable member in one direction moving the pawl into engagement with one of said projections to prevent relative rotation of said rotatable member and said second member, rotation of said rotatable member in the other direction moving the pawl out of engagement with said projections and maintaining the pawl in disengaged position during such rotation.

In testimony whereof I hereunto affix my signature.

EUGENE E. LANDAHL.